US008577876B2

(12) United States Patent
Kozko et al.

(10) Patent No.: US 8,577,876 B2
(45) Date of Patent: Nov. 5, 2013

(54) SYSTEM AND METHOD FOR DETERMINING ART PREFERENCES OF PEOPLE

(75) Inventors: Dmitry Kozko, Aventura, FL (US); Ivan Onuchin, Hollywood, FL (US); Nikolay Shturkin, Yekaterinburg (RU); Curtis Wolfe, Miami, FL (US)

(73) Assignee: Met Element, Inc., North Miami Beach, FL (US)

( * ) Notice: Subject to any disclaimer, the term of this patent is extended or adjusted under 35 U.S.C. 154(b) by 0 days.

(21) Appl. No.: 13/135,965

(22) Filed: Jul. 19, 2011

(65) Prior Publication Data

US 2012/0310925 A1   Dec. 6, 2012

Related U.S. Application Data

(60) Provisional application No. 61/520,196, filed on Jun. 6, 2011, provisional application No. 61/571,594, filed on Jun. 30, 2011.

(51) Int. Cl.
*G06F 17/30* (2006.01)

(52) U.S. Cl.
USPC ............... 707/723; 707/737; 707/748

(58) Field of Classification Search
CPC ............ G06F 17/30864; G06F 17/30867; G06Q 30/02
USPC .................... 707/723, 737, 748
See application file for complete search history.

(56) References Cited

U.S. PATENT DOCUMENTS

| | | | | |
|---|---|---|---|---|
| 5,982,945 A * | 11/1999 | Neff et al. | ............ | 382/271 |
| 6,453,246 B1 * | 9/2002 | Agrafiotis et al. | ............ | 702/27 |
| 6,643,645 B1 * | 11/2003 | Bradley et al. | ............ | 1/1 |
| 6,708,174 B1 * | 3/2004 | Tenorio | ............ | 1/1 |
| 6,732,149 B1 * | 5/2004 | Kephart | ............ | 709/206 |
| 7,071,842 B1 * | 7/2006 | Brady, Jr. | ............ | 340/988 |
| 7,075,000 B2 * | 7/2006 | Gang et al. | ............ | 84/600 |
| 7,228,283 B1 * | 6/2007 | Hornstein | ............ | 705/7.32 |
| 7,589,628 B1 * | 9/2009 | Brady, Jr. | ............ | 340/539.11 |
| 7,654,673 B2 * | 2/2010 | Sung et al. | ............ | 351/223 |
| 7,707,132 B2 * | 4/2010 | Xie et al. | ............ | 706/45 |
| 7,734,641 B2 * | 6/2010 | Kanigsberg et al. | ............ | 707/765 |
| 7,774,341 B2 * | 8/2010 | Aravamudan et al. | ............ | 707/731 |

(Continued)

OTHER PUBLICATIONS

Elzer et al., "Recognizing and Utilizing User Preferences in Collaborative Consultation Dialogues", In Proceedings of the Fourth International Conference on User Modeling, 1994, pp. 19-24 (6 pages), accessed online at <http://cs.millersville.edu/lib/userfiles/selzer/publications/elzer94recognizing.pdf> on Jun. 26, 2012.*

*Primary Examiner* — Phuong Thao Cao
(74) *Attorney, Agent, or Firm* — Inventa Capital PLC (57) ABSTRACT

A system and method of the present invention present a web based music station. The system includes a website having at least two engine components such as a table of a playlist and a table of a content references. A system includes a controller with an algorithm incorporated therein. The algorithm is configured to retrieve various images and music pre-stored in the controller and presents these images and the music to the users. The system tries to reconstruct the "logical priority chains" of user perception as it relates to both the music and the images. The system then clusterizes picks of the music and the images and the users. The system then binds both music and images together using non-linear mapping to determine preference of each user.

7 Claims, 3 Drawing Sheets

(56) References Cited

U.S. PATENT DOCUMENTS

| | | | |
|---|---|---|---|
| 7,876,215 B1* | 1/2011 | Brady, Jr. | 340/539.11 |
| 7,953,735 B2* | 5/2011 | Yamamoto et al. | 707/736 |
| 8,112,720 B2* | 2/2012 | Curtis | 715/811 |
| 8,185,487 B2* | 5/2012 | Tuzhilin et al. | 706/47 |
| 8,271,549 B2* | 9/2012 | Klein et al. | 707/813 |
| 8,315,203 B2* | 11/2012 | Ashley et al. | 370/328 |
| 8,386,519 B2* | 2/2013 | Kenedy et al. | 707/784 |
| 2001/0056415 A1* | 12/2001 | Zhu et al. | 707/1 |
| 2003/0037041 A1* | 2/2003 | Hertz | 707/1 |
| 2003/0154084 A1* | 8/2003 | Li et al. | 704/273 |
| 2003/0231246 A1* | 12/2003 | Gindele et al. | 348/222.1 |
| 2004/0103092 A1* | 5/2004 | Tuzhilin et al. | 707/3 |
| 2004/0254957 A1* | 12/2004 | Hyotyniemi et al. | 707/104.1 |
| 2005/0021499 A1* | 1/2005 | Bradley et al. | 707/1 |
| 2005/0206611 A1* | 9/2005 | Ching et al. | 345/156 |
| 2005/0283803 A1* | 12/2005 | Kimura et al. | 725/46 |
| 2006/0056806 A1* | 3/2006 | Terakado et al. | 386/69 |
| 2006/0129547 A1* | 6/2006 | Yamamoto et al. | 707/5 |
| 2006/0254411 A1* | 11/2006 | Alcalde et al. | 84/608 |
| 2006/0294093 A1* | 12/2006 | Yamamoto et al. | 707/5 |
| 2008/0021851 A1* | 1/2008 | Alcalde et al. | 706/21 |
| 2008/0034284 A1* | 2/2008 | Skicewicz et al. | 715/246 |
| 2008/0091342 A1* | 4/2008 | Assael | 701/202 |
| 2008/0114756 A1* | 5/2008 | Konig et al. | 707/5 |
| 2008/0167969 A1* | 7/2008 | Ofer et al. | 705/26 |
| 2009/0043811 A1* | 2/2009 | Yamamoto et al. | 707/104.1 |
| 2009/0150491 A1* | 6/2009 | Yamamoto | 709/204 |
| 2009/0228424 A1* | 9/2009 | Mori et al. | 706/54 |
| 2009/0249254 A1* | 10/2009 | Walker | 715/834 |
| 2009/0259606 A1* | 10/2009 | Seah | 706/16 |
| 2009/0307314 A1* | 12/2009 | Smith et al. | 709/206 |
| 2009/0319907 A1* | 12/2009 | Tokuda | 715/739 |
| 2010/0030619 A1* | 2/2010 | Ofer et al. | 705/10 |
| 2010/0053192 A1* | 3/2010 | Miyazaki | 345/589 |
| 2010/0082487 A1* | 4/2010 | Nelsen | 705/44 |
| 2010/0094866 A1* | 4/2010 | Cuttner et al. | 707/723 |
| 2010/0121936 A1* | 5/2010 | Liu et al. | 709/217 |
| 2010/0125800 A1* | 5/2010 | Jana et al. | 715/757 |
| 2010/0179857 A1* | 7/2010 | Kalaboukis et al. | 705/10 |
| 2010/0185579 A1* | 7/2010 | Hong et al. | 706/52 |
| 2011/0022542 A1* | 1/2011 | Lutnick et al. | 705/36 R |
| 2011/0208331 A1* | 8/2011 | Sandler et al. | 700/94 |
| 2011/0231305 A1* | 9/2011 | Winters | 705/39 |
| 2011/0247036 A1* | 10/2011 | Adimatyam et al. | 725/40 |
| 2012/0078824 A1* | 3/2012 | Bonet et al. | 706/12 |
| 2012/0089590 A1* | 4/2012 | Osann, Jr. | 707/709 |

* cited by examiner

SYSTEM AND METHOD FOR DETERMINING ART PREFERENCES OF PEOPLE

RELATED APPLICATIONS

This is a non-provisional application that claims priority to a provisional application Ser. No. 61/520,196 filed on Jun. 6, 2011 and a provisional application Ser. No. 61/571,594 filed on Jun. 30, 2011 and incorporated herewith by reference in its entirety.

FIELD OF THE INVENTION

The present invention relates to an Internet based systems and methods for information retrieval and, in particular, to a system and method for determining preferences of people.

BACKGROUND OF THE INVENTION

The broadcasting of radio by means of the Internet is a fairly recent development and becomes more and more popular among users. Typically, as a listener logs onto a particular web site, audio files, usually songs, are played. The selections of which audio files are to be played are controlled by the owner or operator of the web site. In the past, in conjunction with conventional radio a desirable procedure was to get the listeners involved in conjunction with the broadcasting station. Generally, this type of procedure increased the number of listeners, and of course the greater number of listeners the more successful a radio station. One way to get the listeners involved is to have the radio station accept requests for particular songs or to hear certain audio files.

The art is replete with numerous prior art Internet based radio systems and methods. With the ever-growing popularity of acquiring music, a variety of these prior art consumer devices such as a digital media player (DMP) or a digital audio player (DAP) are used to play and manage digital music files, wherein these consumer devices may be a single functional device, a multifunctional device, such as a mobile phone, a personal digital assistant (PDA), or a handheld computer. Since these types of prior art consumer devices continually become more portable and versatile, our reliance on such devices for entertainment purposes has grown. In some instances, a user may create a playlist. The playlist may include one or more songs selected by the user that may be played, for example, in sequence or in random order. However, the process of creating a playlist can be time-consuming and burdensome.

There are numerous systems and methods in the prior art that allow the users of these aforementioned prior art devices to download use a principal component analysis (PCA) in order to determine likeness of certain music type of the users. The PCA is a mathematical procedure that uses an orthogonal transformation to convert a set of observations of possibly correlated variables into a set of values of uncorrelated variables called principal components. The number of principal components is less than or equal to the number of original variables. This transformation is defined in such a way that the first principal component has as high a variance as possible (that is, accounts for as much of the variability in the data as possible), and each succeeding component in turn has the highest variance possible under the constraint that it be orthogonal to (uncorrelated with) the preceding components. Principal components are guaranteed to be independent only if the data set is jointly normally distributed.

The PCA is mostly used as a tool in exploratory data analysis and for making predictive models. The PCA can be done by eigenvalue decomposition of a data covariance matrix or singular value decomposition of a data matrix, usually after mean centering the data for each attribute. The results of the PCA are usually discussed in terms of component scores (the transformed variable values corresponding to a particular case in the data) and loadings (the weight by which each standardized original variable should be multiplied to get the component score). The PCA is the simplest of the true eigenvector-based multivariate analyses. If a multivariate dataset is visualised as a set of coordinates in a high-dimensional data space (1 axis per variable), the PCA can supply the user with a lower-dimensional picture, a "shadow" of this object when viewed from its (in some sense) most informative viewpoint. This is done by using only the first few principal components so that the dimensionality of the transformed data is reduced.

Numerous prior art references use the PCA approach in its systems and methods. One of such prior art references in United States Patent Application Publication No. 20090116684 to Andreasson (the Andreasson reference). The Andreasson reference teaches a system and method for generating a playlist of songs based on facial expression of a user. The method includes playing a first song on a device and capturing an image of a user, performing facial expression recognition of the user based on the image, and selecting a second song based on a facial expression of the user. The method taught by the Andreasson reference fails to solve the aforementioned problems because the process of creating a playlist of songs based on this method will be time-consuming and burdensome simply because different users have different personalities and not every user will show facial expressions in response to the song played or image presented to the user. Some users may still have facial expressions that will not be captured by the system of the Andreasson reference. Another problem of the system taught by the Andreasson reference is inaccuracy of the facial expression determination because some users may present such facial expression that can be visible to the system as if the user is unhappy with the image presented to the user wherein, in fact, the user likes the image.

Another prior art reference, namely United States Patent Application Publication No. 20080021851 to Alcade et al. (the Alcade reference) teaches system uses the PCA approach, wherein a series of complex artificial intelligence algorithms analyze a plurality of sonic characteristics in a musical composition, and is then able to sort any collection of digital music based on any combination of similar characteristics. The characteristics analyzed are those that produce the strongest reaction in terms of human perception, such as melody, tempo, rhythm, and range, and how these characteristics change over time. This approach enables the creation of "constellations" of music with similar characteristics, even from different genres and styles, enabling fast yet highly individualized music discovery. Further personalized music discovery is enabled based on a "Music Taste Test".

To provide users with music recommendations, the system employs a number of analysis functions. A "Music Taste Test" (MI Mood module) function learns a user's music preferences via a series of binary choice questions, and delivers lists and/or personalized song recommendations to the user based on this information. Recommendations are prioritized and listed in order of closest song match on a theoretical multi-dimensional grid. A "Soundalikes" function links songs having similar musical/mathematical profiles enabling for music recommendation. A "Discovery" function that also links songs having similar mathematical patterns, but that allows for a wider recommendation than the "Soundalikes"

function. The "Music Taste Test" function and "Soundalikes" function cooperate to establish 'moods' for each song, such as happy, sad, calm, and energetic.

To the extend effective and more advanced as compared with the system and method of the Andreasson reference, the system of the Alcade reference presents numerous drawbacks. For example, not every user will be willing to go through a plurality of questions in order to answer them to determine the type of music that the user will like. This procedure is time consuming and to some extent may not be practicable to those users who may not understand English or not understand the question.

Another prior art reference such as U.S. Pat. No. 4,839,853 to Deerwester et al. (the Deerwester reference) teaches a method of latent semantic analysis (the LSA), which is completely different from the PCA approach. This method presents a technique in natural language processing, in particular in vectorial semantics, wherein the method analyzes relationships between a set of documents and the terms they contain by producing a set of concepts related to the documents and terms. As further taught by the Deerwester reference, the LSA assumes that words that are close in meaning will occur close together in text. A matrix containing word counts per paragraph (rows are represented by unique words and columns are represented by each paragraph) is constructed from a large piece of text and a mathematical technique called singular value decomposition (the SVD) is used to reduce the number of columns while preserving the similarity structure among rows. Words are then compared by taking the cosine of any two rows. Values close to 1 represent very similar words while values close to 0 represent very dissimilar words.

To the extend effective, the LSA application as disclosed in the Deerwester reference fails to teach application that will allow to determine preference of the users to certain type of music thereby clusterizing the users into groups in order to provide the users with music of their preference.

Therefore, an opportunity exists for an improved system and method whereby users will enjoy playlist of songs based on the user's choice and preference will be presented to the users based on initial questionnaire wherein the users will not select songs to create the playlist thereby eliminating the need for creation of such playlist that is time-consuming and burdensome.

SUMMARY OF THE INVENTION

A system and method of the present invention is used to determine personal preferences of users in music, movies, poetry, and any other forms of art and clusterizing the users according to their preferences. Those skilled in the art will appreciate that the system and method of the present invention may be used to in other areas of research and development where there is a need to determine preferences in various fields for the purposes of research, marketing, and the like. The users access the system through personal communication devices, such as, a mobile phone, a personal computer, and the like. The system includes a user interface component for receiving information from the personal communication devices. The interface component is operably communicated with an image controller, a song controller, and a coordinating controller with all of the aforementioned components being cooperable with one another and adaptable to receive and exchange information between one and the other.

A central engine or a central processing unit (the CPU) is adaptable to receive information from the coordinating controller. The CPU is communicated with a content delivery network or content distribution network (CDN). As appreciated by those skilled in the art the CDN is a system of computers containing copies of data placed at various nodes, such as the nodes of the present invention. There numerous data types cached in the CDN of the present invention. These data includes web objects, downloadable objects (media files, software, documents), applications, live streaming media, and database queries without limiting the scope of the present invention. The CPU includes at least one sub component with a software presenting an algorithm.

The software presents an operable connection with the coordinating component and is configured to algorithmically calculate various distances between locations a first user and a second user and each of a plurality of the first test elements, such as graphical illustrations, pictures, videos, and the like, and a plurality of the second test elements such as for example, songs, various melodies, etc. The number of users is unlimited and the first and second users as mentioned above are not intended to limit the scope of the present invention and are presented for explanatory purposes. The software is configured to identify and map location of each user in relation to the first and second test elements on a multidimensional surface and relationship between the first and second user and the test elements selected by the first and second users to determine consecutive orders of the first test elements and the second test elements relative to the locations of each of the first and second users. The software then identifying a first cluster and a second cluster based on difference between values of the consecutive orders.

Alluding to the above, the software is configured to algorithmically calculate various distances between a location of a third user and said plurality of the first test elements and the second test elements presented to and selected by the third user to determine a consecutive order of the first test elements and the second test elements relative to the location of the third user thereby assigning the third user either to the first cluster or the second cluster as the software determines a match between the values of one of the consecutive orders of the first and second users and the value of the consecutive order of the third user.

In general the algorithm of the present invention picks various first test elements, i.e. images of good dispersion, good average user rating from the initial set of images stored in the image controller, and previously viewed by many other users who pre-tested the system. After getting of triplet marks, the system tries to reconstruct the "logical priority chains" of user perception. For example, if in a first combination of images or a first triplet, i.e. images 1, 2, 3, the user selects the image 1, and in a second combination of images or a second triplet 1, 2, 4, the user selects image 1, and then in a third combination of images or a third triplet 2, 3, 4, the user selects image 4, then the chain of the images selected by the user will be presented: 1>4>(2 and 3). Such chains are being restored in the CPU for numerous combinations of images.

Then the CPU will find the approximate coordinates of the user picks in a space of properties in order to clusterize picks and users. The user pick means a selection of the first and the second test elements by the user 14. The audio, i.e. music picks presented to the users are analyzed and clusterized in the same fashion. The functionality of the algorithm is based on existence of correlation between user visual, i.e. graphical illustration and audio preferences. The most significant correlations are determined through reduction in distance between a particular user location and locations of the test elements to determine the aforementioned logical priority chain in order to determine classes of the users and store the same in the designated or pre-determined cluster.

An advantage of the present invention is to provide the improved system and method whereby users will enjoy playlist of songs based on the user's choice and preference will be presented to the users based on initial questionnaire.

Another advantage of the present invention is a novel system and method wherein the users will not select songs to create the playlist thereby eliminating the need for creation of such playlist that is time-consuming and burdensome.

BRIEF DESCRIPTION OF THE DRAWINGS

Other advantages of the present invention will be readily appreciated as the same becomes better understood by reference to the following detailed description when considered in connection with the accompanying drawings wherein:

FIG. 3 illustrates the multidimensional surface defined by axis x and y of the FIG. 2 illustrating locations of the user (U1) and another user (U2) and multiple test elements P1, P2, and P3 and distances D1, D2, and D3 defined between U1 and U2 and P1, P2, and P3 thereby illustrating various distal relationships between U1 and U2 and P1, P2, and P3 thereby identifying a pair of clusters that U1 and U2 belong to;

FIG. 4 illustrates the multidimensional surface defined by axis x and y of the FIG. 2 illustrating locations of a new or third user (U3) and multiple test elements P1, P2, and P3 and distances D1, D2, and D3 defined between U3 and P1, P2, and P3 thereby illustrating various distal relationships between U1, U2, and U3 and P1, P2, and P3 thereby identifying what cluster U3 belongs to.

DESCRIPTION OF THE INVENTION

Figure 1:
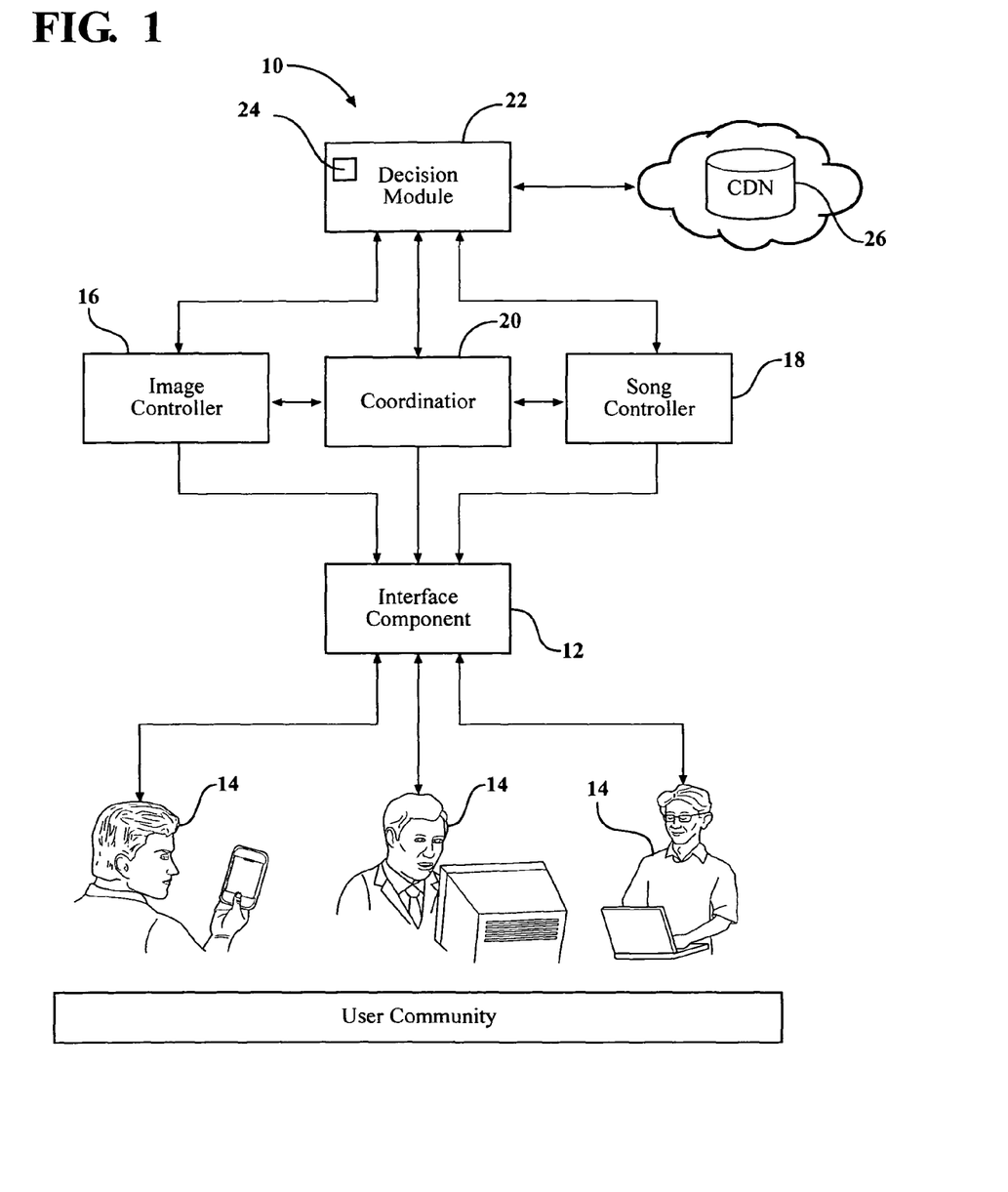
FIG. 1 illustrates a schematic view of a system architecture of the present invention.

A system of the present invention is generally shown at 10 in FIG. 1. The system 10 present a web based application. The system 10 includes a website having at least an interface component 12 adaptable to receive information from users 14 through the user personal devices such as, a mobile phone, a personal computer, and the like. The number of the users 14 is unlimited and reference to a first user and a second user as will be mentioned below is not intended to limit the scope of the present invention and are presented for explanatory purposes. The interface component 12 is operably communicated with an image controller 16 for storing and circulating first test elements, such as images, video, and other type of information to be presented to the users 14 so the users can make a selection of the first test element based on the user's preference. The system includes a music controller 18 for storing and circulating second test elements, such as music, songs, and any other types of audio recording to be listened by the users 14 so the users 14 can make a selection of the second test element based on the user's preference. Each user 14 will use a screen that will appear of the user's personal devices such as, the mobile phone, the personal computer, and the like. The screen (not shown) will provide the user 14 with several options that will allow the user 14 to either indicate what option the user 14 likes or dislikes as the first and second test elements presented to be selected by the user or if the user prefers not to make a selection. Various screen designs may be used with the present invention without limiting the scope of the present invention. The system 10 includes a coordinating controller 20 with all of the aforementioned components being cooperable with one another and adaptable to receive and exchange information between one and the other.

A central engine or a central processing unit (the CPU) 22 is adaptable to receive information from the coordinating controller 20. The CPU 22 is communicated with a content delivery network or content distribution network (CDN) 26. As appreciated by those skilled in the art the CDN 26 is a system of computers containing copies of data placed at various nodes, such as the nodes of the present invention. The CDN 26 improves access to the data it caches by increasing access bandwidth and redundancy and reducing access latency. There numerous data types cached in the CDN 26 of the present invention. These data includes web objects, downloadable objects (media files, software, documents), applications, live streaming media, and database queries without limiting the scope of the present invention.

Figure 2:
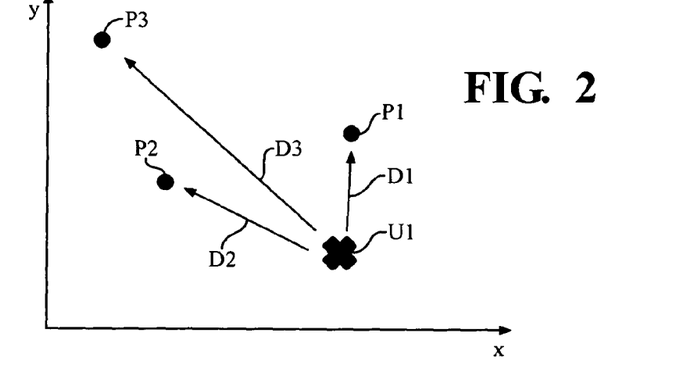
FIG. 2 illustrates a multidimensional surface defined by axis x and y of the inventive algorithm illustrating a location of a user (U1) and multiple test elements (P1, P2, and P3) and distances D1, D2, and D3 defined between U1 and P1, P2, and P3.

The CPU 22 includes at least one sub component 24 with a software presenting an algorithm. The software presents an operable connection with the coordinating component 20. The software of the CPU 22 is configured to map location of each user 14 on a multidimensional surface presented by an axis x and an axis y as best illustrated in FIG. 2. Those skilled in algorithmic art will appreciate that other dimensional parameters may be used in connection with the present invention to present a map to determine location of the users 14 relative to one another and the first and second test elements presented at FIGS. 2 through 5 at P1 through P3. As shown in FIG. 2, the software is configured to algorithmically calculate various distances between locations a first user U1 and the test elements P1 through P3, wherein various distances are presented by D1 through D3 based on preferences of the user D1 in relationship to each test element P1 through P3. The software will determine that the user U1 prefers based on each user's 14 personal preferences the test element P1 the most and then in its respective consecutive order the test element 2 and then the test element P3. The first test elements and the second test elements are defined and are not limited to various forms of art such as graphical illustrations, pictures, videos, songs, various melodies, and other forms of art.

Figure 3:
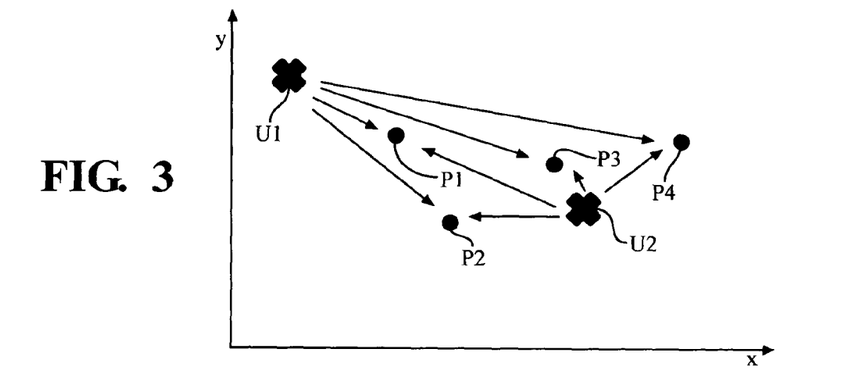

Referring to FIG. 3, a second user U2 is mapped on the multidimensional surface. Here, the same or similar test elements P1 through P4 are presented to the second user U2. As illustrated in FIG. 3, the distances between the users U1 and U2 and the test elements P1 through P4 are different, which means that each of the users U1 and U2 have different preferences and prefer different test elements as their first, second and third choices. For example, as shown in FIG. 3, the first user U1 prefers the test element P1 as his first choice, and then the test elements P2, P3, and P4 consecutively.

Unlike the user U1, the second user U2 has different preference to the test elements P1 through P4. The second user U2 prefers the test element P3 as his first choice, and then the test elements P4, P2, and P1 consecutively. Each plurality of the first test elements and the second test elements presented to and selected by the first and second users U1 and U2 allow the software to determine consecutive orders of the first test elements and the second test elements relative to the locations of each of the first and second users U1 and U2 thereby identifying a first cluster and a second cluster based on difference between values of the consecutive orders.

Figure 4:
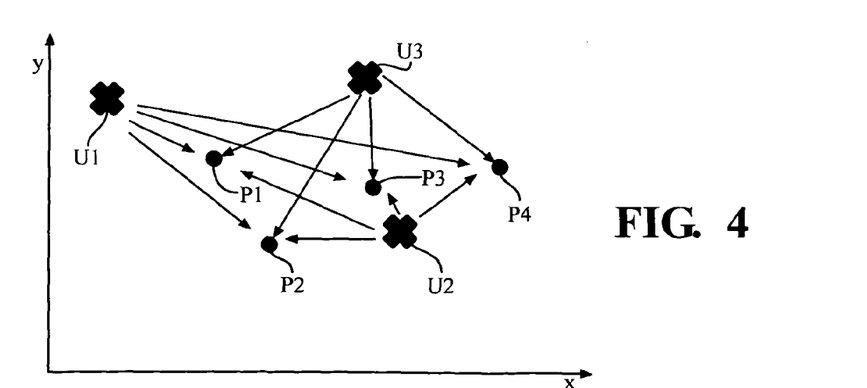

Referring now to FIG. 4, a third user U3 is mapped on the multidimentional surface. Unlike the users U1 and U2, the third user U3 has different preference to the test elements P1 through P4. The third user U3 prefers the test element P3 as his first choice, and then the test elements P1, P4, and P2 consecutively. Here, the software will algorithmically calculate various distances between the location of the third user U3 and the plurality of the first test elements and the second test elements P1 through P4 presented to and selected by the third user U3 to determine a consecutive order of the first test elements and the second test elements P1 through P4 relative to the location of the third user U3 thereby assigning the third user U3 either to the first cluster and the second cluster as the software determines a match between the values of one of the consecutive orders of the first and second users U1 and U2 and said value of the consecutive order of the third user U3.

In an example illustrated in FIG. 4, all three users U1, U2, and U3 will belong to different clusters based on the preferences in their choices of the test elements P1 through P4, i.e. a "logical priority chains" and differences between the distances between location of each user U1, U2, and U3 and locations of the test elements P1 through P4. The algorithm picks various images of good dispersion, good average user rating from the initial set of images stored in the image controller 16, and previously viewed by many testers. The algorithm is not limited to just several images to be presented to each user. Numerous images may be presented to the users. For example, if in a first combination of the first test lements, such as images or a first triplet, i.e. 1, 2, 3, the user U1 selects the image 1, and in a second combination of the images or a second triplet 1, 2, 4, the user selects image 1, and then in a third combination of the images or a third triplet 2, 3, 4, the user selects image 4, then the chain of the images selected by the user U1 will be presented as follows: 1>4>(2 and 3). Such chains are being restored in the CPU 22 for numerous combinations of images.

Figure 5A:
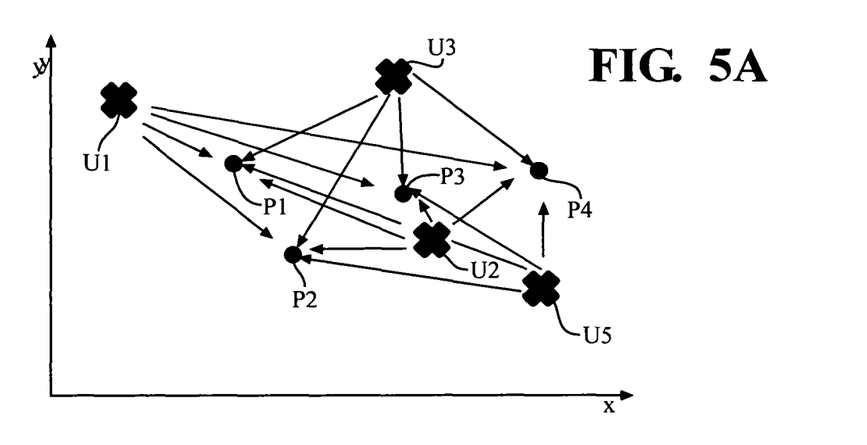
FIGS. 5A and 5B illustrate a pair multidimensional surfaces such as a first multidimensional surface of first test elements and a second multidimensional surface of second test elements thereby illustrating locations of several users U1, U2, and U3 and its relationship to respective test elements P1, P2, and P3 and distances D1, D2, and D3 defined between U1, U2, and U3 and P1, P2, and P3 thereby determining correlation between the users preference in music and graphical illustrations.
Figure 5B:
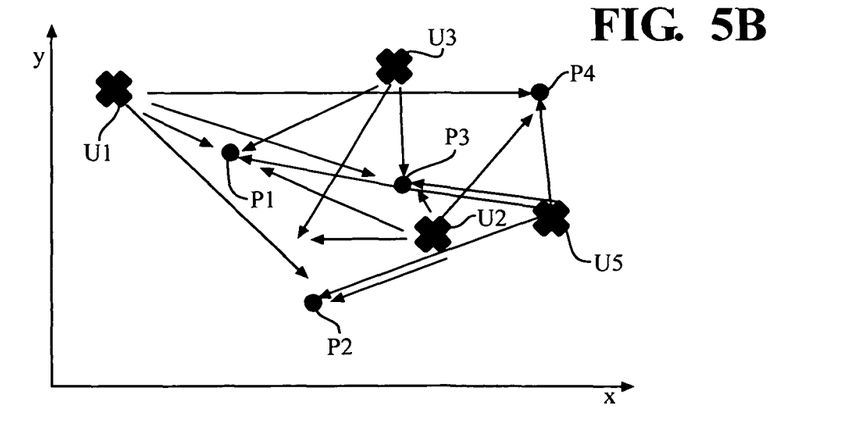

Then the CPU 22 will find the approximate coordinates of the picks of each user 14 in a space of properties in order to clusterize picks and the users 14. The second test elements such audio, i.e. music picks also present to the users U1 through U5 presented to the users are analyzed and clusterized in the same fashion as described above. As illustrated in FIGS. 5A and 5B, a first dimensional surface, generally shown at A, represents location of the users U1 through U5 in relationship to the first test elements P1 through P4, wherein the first test elements are graphic images presented to each of the users U1 through U5. FIG. 5 also illustrates a second dimensional surface, generally shown at B, represents location of the users U1 through U5 in relationship to the second test elements P1 through P4, wherein the second test elements are audio, i.e. music presented to each of the users U1 through U5.

The functionality of the algorithm is based on existence of correlation between the user visual, i.e. graphical illustration and the user audio preferences. The most significant correlations are determined through reduction in distance between a particular user location to determine the aforementioned logical priority chain in order to determine classes of the users U1 through U5 and store the same in the designated or predetermined cluster.

For example, let's assume that the first user U1 is presented number of sets of images P1 through P3 with at least three images in each set or triplet. The user U1 will pick one of the images that the users enjoys the most. Let's also assume that the user U1 picked image 1 out of the first set of images. If we apply a formula based on likeness (L), the equation will be presented as follows: L (P1)>L (P2) & L (P1)>L (P3), which means that the user U1 likes the image 1 more than the image 2 and the image 3. If we apply a formula based on difference or distance (D), then the equation will look as follows: D (P1)<D (P2) & D (P1)<D (P3), wherein the image 1 is closed to the user as compared to the difference between the image 2 and the image 3.

As the information received from the user U1 is applied to the multidimensional space as illustrated for example in FIG. 2, defined by the vertical and horizontal axis x and y, each pick or test element P1 through P3 and the user U1 is characterized by M-dimensional position vector (x, y, ..., m). Thus, if there are several users and each of the users has multiple picks and each of the users have different preferences as compared to the images 1, 2, and 3.

The software of the present invention presents numerous formulas for calculations. As best shown in FIG. 2, the multidimensional space M is defined by the horizontal axis x and the vertical axis y, the user U1 was presented several choices of images or music defined by P1, P2, and P3. The user U1 prefers P1 to P2 and then to P3. The distance between U1 and P1 is shorter than between U1 and P2. Same for U1-P1 and U1-P3. Each user's answer "I choose picture 1 from this 3 images" creates 2 constraint equations. The set of constraints, based on user picks, defines the logic equations for distance correspondence:

$$D(U1, P1) < D(U1, P2)$$

$$\ldots$$

$$D(Uu, Pv) < D(Uu, Pw)$$

After expansion and projecting to coordinate space, the following set of equations, containing distance between user and picture calculation formula on both sides is as follows:

$$1) \sqrt{(U1_x - P1_x)^2 + (U1_y - P1_y)^2} < \sqrt{(U1_x - P2_x)^2 + (U1_y - P2_y)^2}$$

$$\ldots$$

$$u) \sqrt{(Uu_x - Pv_x)^2 + (Uu_y - Pv_y)^2} < \sqrt{(Uu_x - Pw_x)^2 + (Uu_y - Pw_y)^2}$$

Alluding to the formula shown above, $U1x$ is the x'th coordinate of $1^{st}$ user point, $P2y$—y'th coordinate of $2^{nd}$ picture or music point, etc. In general—U—user points, P—picture or music points, and subscript means coordinate index in M-dimensional space. Equations above (one in line) are the $1^{st}$, ..., u'th Constraint(i) functions. The set of constraint functions is defined by training set of user marks. The algorithm will then find such kind of placement for picks and user coordinates (in this M-dimensional space) to violate the minimum of constraints. So, in general, the following vector needs to be found:

$$\{U1x, U1y, \ldots, U1m, \ldots, Unx, Uny, \ldots, \\ Unm, \ldots; P1x, \ldots P1m, \ldots, Pwx, \\ Pwy, \ldots, Pwm\}$$

such that $$\min_Z \sum_{i=0}^{i=u} Violation(Constraint(i, F(Z)))$$

wherein a constraint is the function from above, taking arguments i (constraint number) and F(Z), where F is a combinatorial function, giving one placement of all objects U and P in M-dimensional space, taking parameter Z, which is the all possible combinations of placements. Violation(x) function gets equation and returns 1 if it is false. The sample placement for such system of constraints presented as follows:

$D(U1,P1)<D(U1,P2)$ $D(U1,P1)<D(U1,P3)$ $D(U1,P2)<D(U1,P4)$ $D(U2,P3)<D(U2,P2)$ $D(U2,P3)<D(U2,P4)$ $D(U2,P3)<D(U2,P1)$

Sample of such placement satisfying all constraints is shown on FIG. 3. As mentioned above, here, there are two users U1 and U2. There are four test elements such as the images or music options P1, P2, P3, and P4 presented to the users U1 and U2 to be picked. FIG. 3 clearly illustrates that the difference between each user U1 and U2 and each of the options P1, P2, P3, and P4. It means that each user U1 and U2 has different preferences to each option of the images or music P1, P2, P3, and P4. So, the purpose of the first stage of the algorithm is to find such placements for the input combination of all users' choices. The same approach is used to determine preferences in the images and the music. The algorithm gets two various placements with corresponding points {U1, . . . , Un}. Then the algorithm determines through use of non-linear mapping the difference between or correlation between one space, i.e. the image space to another, i.e. the music space. The set of points {U1, . . . , Un} is determined after stage 1 in the image space.

For example, as best illustrated in FIG. 4, the algorithm performed two operations wherein each of three users—U1, U2, and U3 were presented different choices of picks P1 through P4. Based on the distance between each of the picks P1 through P4 in relationship to each user U1, U2, and U3, the algorithm determined a space based on locations of each user U1, U2, U3, and U4 in relation to one and the other. As each user U1, U2, U3 makes the choices of images and music played as the images are presented and picked, the algorithm determines distance between each of the picks P1 through P4 in relationship to each user U1, U2, and U3.

As each new user 14 uses the system 10, the user's location will be mapped on the multidimensional surface. The algorithm will determine preferences or picks such as P1 through P4 for both images and music. Based on determination of a consecutive order of the picks P1 through P4 relative to the location of each new user, the algorithm will assign each new user to the clusters predetermined by the software based on prior calculation as the software determines a match between the values of one of the consecutive orders of the previous users and the value of the consecutive order of such new user. The system has numerous industrial application that require clusterization of users based on the preferences of the users. For example, the system 10 may include a database of certain songs, videos, and other form of performing art that members of the different clusters may prefer to listed. The types of these forms of performing art may constantly be renewed and added on by the system and provided to the users to be listed and viewed. For example, if any new user is assigned by the software to a predetermined cluster based on such user's picks of first and second test elements, that user may be presented different songs and videos and the like as other members of the same or substantially similar cluster will enjoy.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A system for determining personal preferences of users in various forms of art whereby the users access said system through personal communication devices, said system comprising:

a user interface component for receiving information from the personal communication devices;

a controller device for storing first and second test elements;

a central processing unit operably communicated with said controller device and said user interface component for receiving information from the users to determine correlation between said first and second test elements presented to the users through said user interface component;

a software of said central processing unit configured to calculate various distances between locations of a first user and a second user and each of a plurality of said first test elements and said second test elements presented to and selected by the first user and the second user respectively to determine consecutive orders of said first test elements and said second test elements relative to said locations of each of the first user and the second user thereby identifying preferences of the first user in one form of art and preferences of the second user in another form of art whereby said preferences of the first user and the second user are determined by said software based on difference between values of said consecutive orders;

presenting at least one of said preferences of art of the first user and the second user to a third user as said software calculates various distances between a location of the third user and said plurality of said first test elements and said second test elements presented to and selected by the third user to determine a consecutive order of said first test elements and said second test elements relative to said location of the third user thereby identifying preference of the third user in either forms of art of the first user and the second user as identified by said software as said software determines a match between said values of one of said consecutive orders of the first user and the second user and values of said consecutive order of the third user;

wherein said controller device includes a first sub-controller for storing and circulating through said user interface component said first test elements and a second sub-controller for storing and circulating through said user interface component said second test elements; and wherein values of said consecutive orders represent distances between locations of each user and locations of each test element.

2. The system as set forth in claim 1, wherein said first test elements are further defined by a plurality of various images including at least one of graphical illustrations, videos.

3. The system as set forth in claim 2, wherein said second test elements are further defined by a plurality of various sounds including at least one of songs, melodies.

4. The system as set forth in claim 3, wherein said software configured to map said locations of the first, second and third users and said first and second test elements.

5. The system as set forth in claim 1, wherein said user interface component includes at least one of a desktop computer, a laptop computer, a mobile phone.

6. The system as set forth in claim 3, wherein said software further defines each of said consecutive orders by D1, D2, D3 ... Dn and defines the users by U1, U2, U3 ... Un and said first and second test elements by P1, P2, P3 ... Pn.

7. The system as set forth in claim 6, wherein said software includes a formula to receive a set of equations, containing distance between at least one of the first user, the second user, and the third user and said first and second test elements, said formula presented by:

$$1) \sqrt{(U1_x - P1_x)^2 + (U1_y - P1_y)^2} < \sqrt{(U1_x - P2_x)^2 + (U1_y - P2_y)^2}$$

...

$$u) \sqrt{(Uu_x - Pv_x)^2 + (Uu_y - Pv_y)^2} < \sqrt{(Uu_x - Pw_x)^2 + (Uu_y - Pw_y)^2}$$

wherein U1$x$ is the x'th coordinate of U1, P2$y$ is the y'th coordinate of P2.

\* \* \* \* \*